US012773072B1

(12) United States Patent
Skeini

(10) Patent No.: US 12,773,072 B1
(45) Date of Patent: Oct. 27, 2026

(54) CHICKEN WING GRABBING DEVICE

(71) Applicant: Russell Skeini, St Catharines (CA)

(72) Inventor: Russell Skeini, St Catharines (CA)

( * ) Notice: Subject to any disclaimer, the term of this patent is extended or adjusted under 35 U.S.C. 154(b) by 1006 days.

(21) Appl. No.: 17/888,609

(22) Filed: Aug. 16, 2022

(51) Int. Cl.
*A47J 43/28* (2006.01)
*B25G 1/10* (2006.01)

(52) U.S. Cl.
CPC ............ *A47J 43/283* (2013.01); *B25G 1/102* (2013.01)

(58) Field of Classification Search
CPC ........ A47F 13/06; A47J 43/283; A61B 10/06; A61B 17/0482; A61B 17/0483; A61B 17/0487; A61B 17/122; A61B 17/1227; A61B 17/128; A61B 17/30; A61B 17/50; A61B 2017/0488; A61B 2017/049; A61B 2017/301; A61B 2017/303; A61B 2017/305; A61B 2017/505; B25B 7/02; B25B 7/04; B25B 7/06; B25B 7/08; B25B 7/12; B25B 7/123; B25B 9/00; B25B 9/02; B25B 9/04; B25G 1/102; B25J 1/00; B25J 1/02; B25J 1/04; B25J 1/06; B25J 15/08; B25J 15/083; B25J 15/086; B25J 15/12
USPC .......................................... 294/99.2; 606/133
See application file for complete search history.

(56) References Cited

U.S. PATENT DOCUMENTS 1,141,741 A * 6/1915 Wiseman ................ B25C 11/00 24/537
1,141,742 A * 6/1915 Wiseman ................ B25C 11/00 294/100
1,284,060 A * 11/1918 Culman .................... B25B 9/02 15/154
1,974,106 A * 9/1934 Gardella ............ A45D 26/0066 606/210
2,413,998 A * 1/1947 Horatio .............. A45D 26/0066 606/133
2,584,547 A * 2/1952 Cahn .................. A45D 26/0071 294/99.2
3,924,303 A * 12/1975 Elliott ..................... D06F 55/00 24/537
4,240,435 A * 12/1980 Yazawa .............. A45D 26/0071 294/99.2
4,634,165 A * 1/1987 Russell ...................... B25B 9/02 294/99.2
4,753,235 A * 6/1988 Hasson .................. A61B 17/30 606/206
4,923,234 A 5/1990 Fairley
5,002,323 A * 3/1991 Idsund ................... A61B 17/30 294/100

(Continued)

FOREIGN PATENT DOCUMENTS

WO 2017031565 3/2017

*Primary Examiner* — Joshua E Rodden
(74) *Attorney, Agent, or Firm* — Kyle A. Fletcher, Esq.

(57) ABSTRACT

The chicken wing grabbing device includes a pair of tongs, a housing, and an actuator. The chicken wing grabbing device may be a hand-held utensil adapted for a user to hold a food item during consumption of the food item. The housing may be adapted to be held by a user's hand. The pair of tongs coupled to the housing may clench the food item when the actuator is engaged. The pair of tongs may continue to hold the food item until the actuator is disengaged. As a non-limiting example, the food item may be a chicken wing and the chicken wing grabbing device may allow the user to consume the chicken wing without transferring sauce to the user's hand.

19 Claims, 5 Drawing Sheets

(56) References Cited

U.S. PATENT DOCUMENTS

| | | | | | |
|---|---|---|---|---|---|
| 5,407,243 | A | * | 4/1995 | Riemann | A61B 17/50 294/100 |
| 5,649,728 | A | | 7/1997 | Warthen | |
| D428,316 | S | | 7/2000 | MacNeil | |
| 6,106,041 | A | * | 8/2000 | Eckhardt | A61B 17/50 294/99.2 |
| 6,494,517 | B1 | | 12/2002 | Durant | |
| 6,571,505 | B1 | * | 6/2003 | Poiencot, Jr. | A01K 97/14 119/806 |
| 6,750,431 | B2 | * | 6/2004 | Miyazaki | H05K 13/0491 294/99.2 |
| 7,287,791 | B2 | | 10/2007 | Carolina | |
| 8,459,708 | B1 | * | 6/2013 | Sandorfi | A47J 43/283 294/99.2 |
| 8,714,606 | B2 | | 5/2014 | Schoeman | |
| 9,004,563 | B2 | | 4/2015 | Buzby | |
| 9,320,392 | B2 | | 4/2016 | Aghamalian | |
| 9,475,197 | B1 | * | 10/2016 | McAuley | B25B 9/02 |
| D897,599 | S | * | 9/2020 | Ishida | D28/44 |
| 11,719,604 | B2 | * | 8/2023 | Greenlee | G01N 1/286 435/309.1 |
| 2014/0249553 | A1 | * | 9/2014 | Kimura | A61B 17/1227 606/157 |
| 2019/0104926 | A1 | * | 4/2019 | Osaka | A61B 1/0057 |
| 2021/0322022 | A1 | * | 10/2021 | Uesaka | A61B 17/1227 |

* cited by examiner

CHICKEN WING GRABBING DEVICE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of hand-held food utensils, more specifically, a chicken wing grabbing device.

SUMMARY OF INVENTION

The chicken wing grabbing device comprises a pair of tongs, a housing, and an actuator. The chicken wing grabbing device may be a hand-held utensil adapted for a user to hold a food item during consumption of the food item. The housing may be adapted to be held by a user's hand. The pair of tongs coupled to the housing may clench the food item when the actuator is engaged. The pair of tongs may continue to hold the food item until the actuator is disengaged. As a non-limiting example, the food item may be a chicken wing and the chicken wing grabbing device may allow the user to consume the chicken wing without transferring sauce to the user's hand.

An object of the invention is to provide a hand-held utensil for holding a food item while the food item is consumed. Another object of the invention is to provide a pair of tongs for grasping the food item.

A further object of the invention is to a housing adapted for the user to hold.

Yet another object of the invention is to provide an actuator operable to clench and release the pair of tongs.

These together with additional objects, features and advantages of the chicken wing grabbing device will be readily apparent to those of ordinary skill in the art upon reading the following detailed description of the presently preferred, but nonetheless illustrative, embodiments when taken in conjunction with the accompanying drawings.

In this respect, before explaining the current embodiments of the chicken wing grabbing device in detail, it is to be understood that the chicken wing grabbing device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the chicken wing grabbing device.

It is therefore important that the claims be regarded as including such equivalent construction insofar as they do not depart from the spirit and scope of the chicken wing grabbing device. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
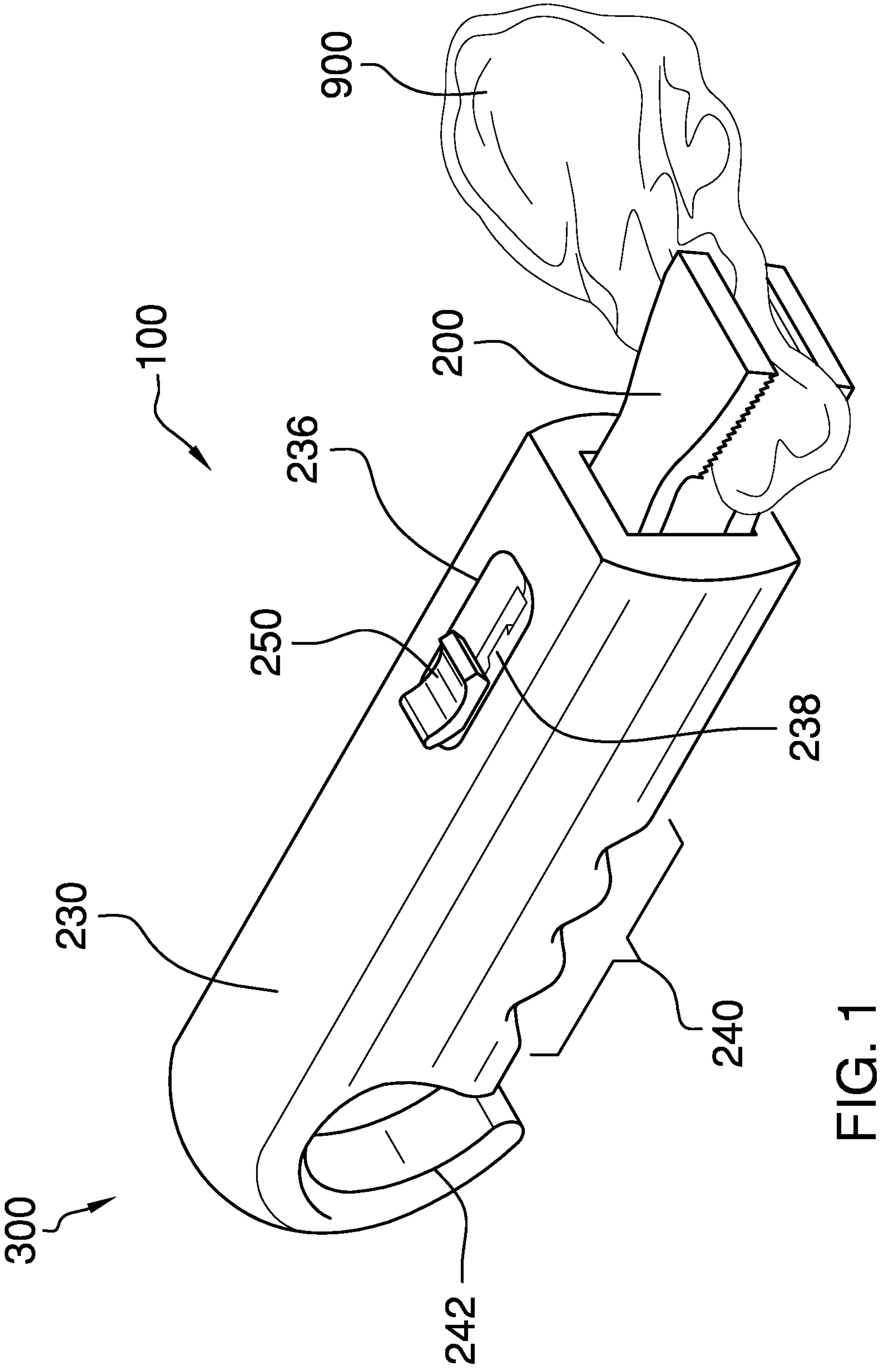
FIG. 1 is an isometric view of a first embodiment of the disclosure.
Figure 2:
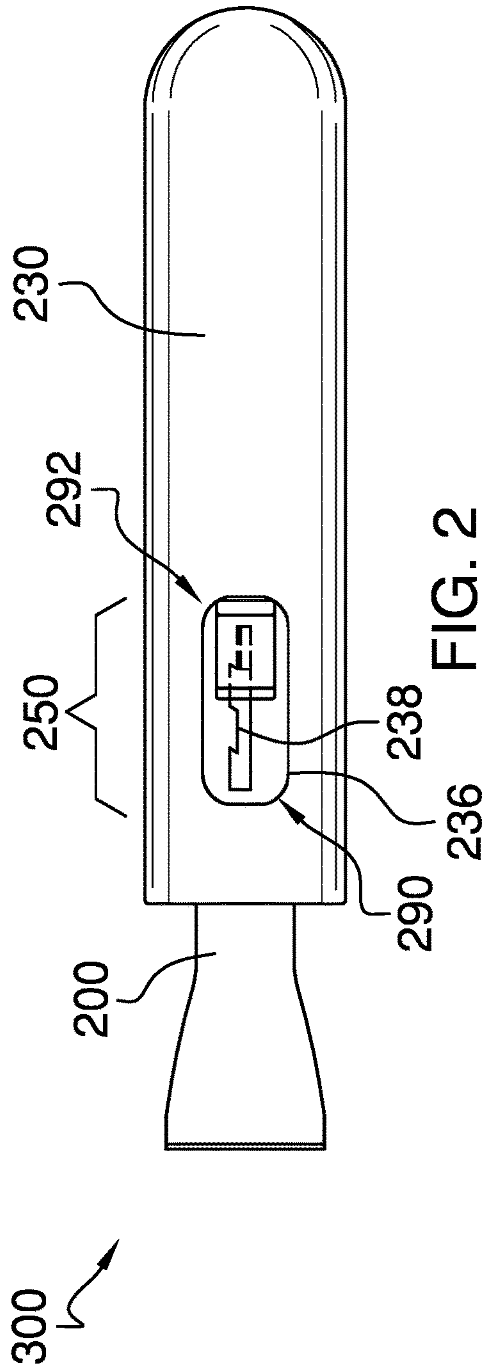
FIG. 2 is a top view of a first embodiment of the disclosure.
Figure 3:
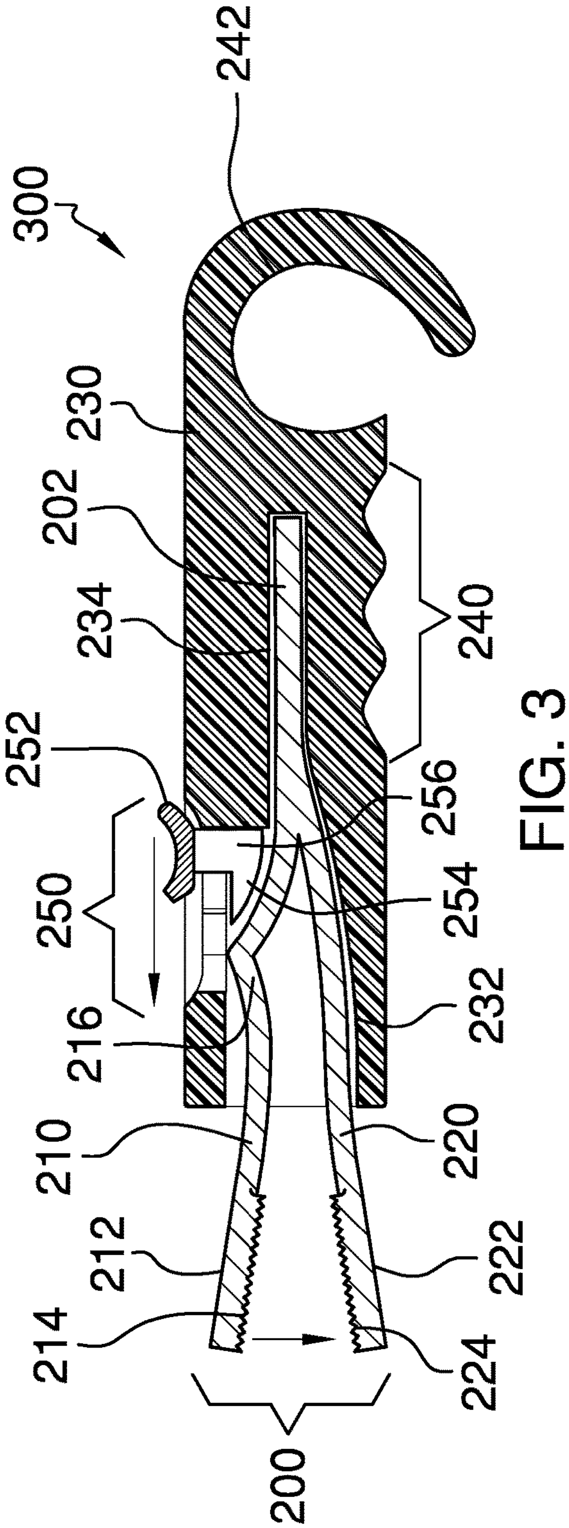
FIG. 3 is a longitudinal cross-sectional view of a first embodiment of the disclosure.
Figure 4:
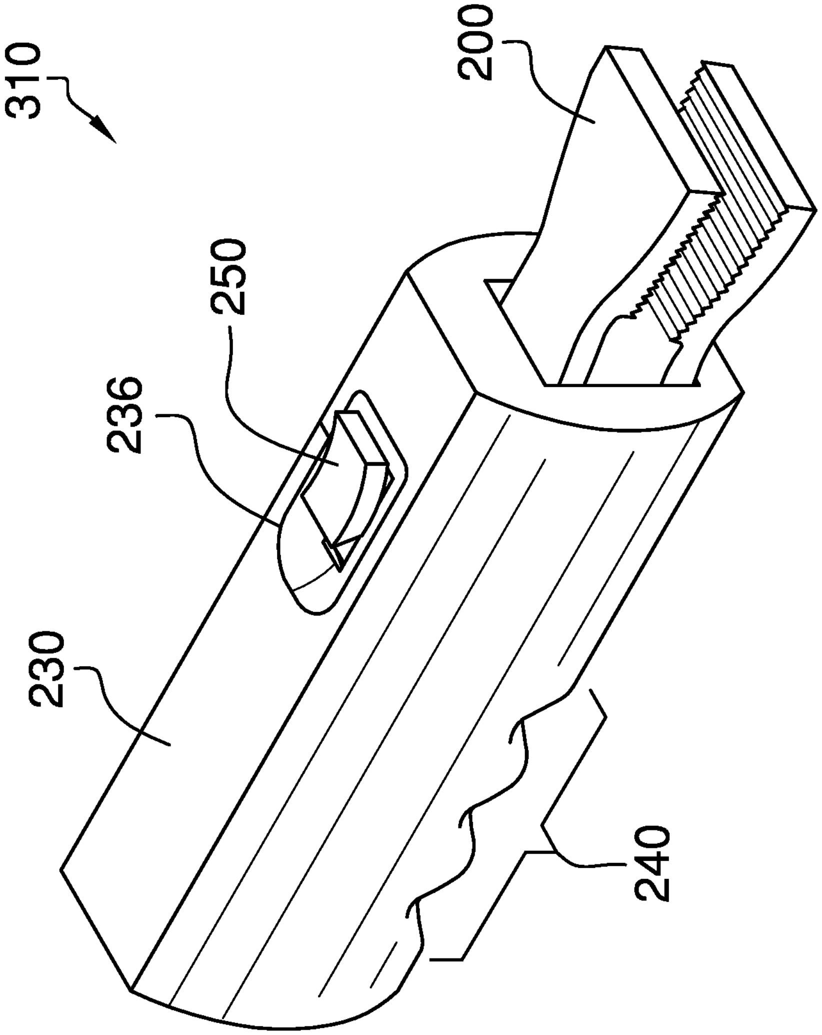
FIG. 4 is an isometric view of a second embodiment of the disclosure.
Figure 5:
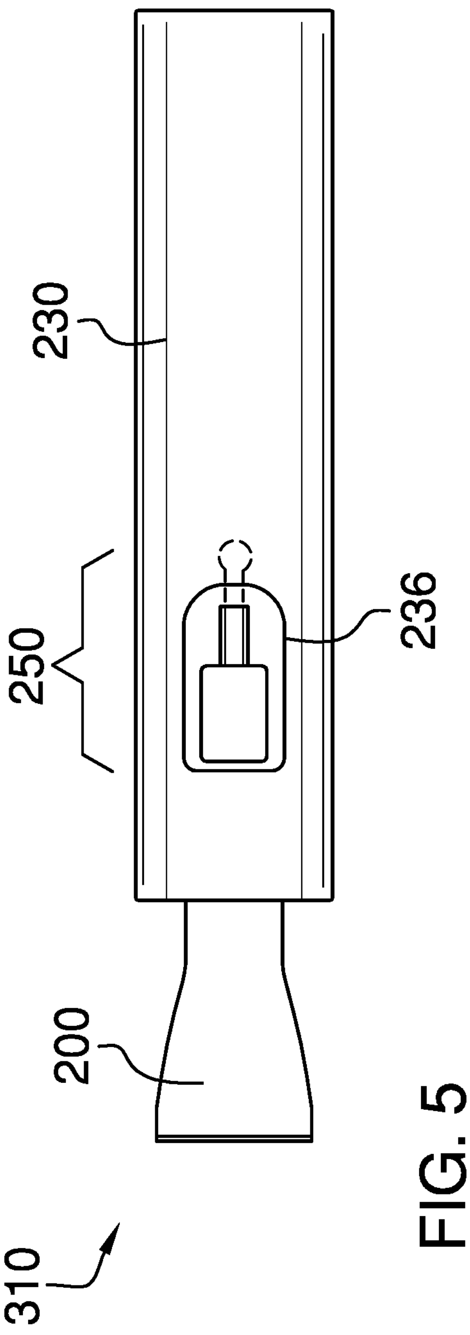
FIG. 5 is a top view of a second embodiment of the disclosure.
Figure 6:
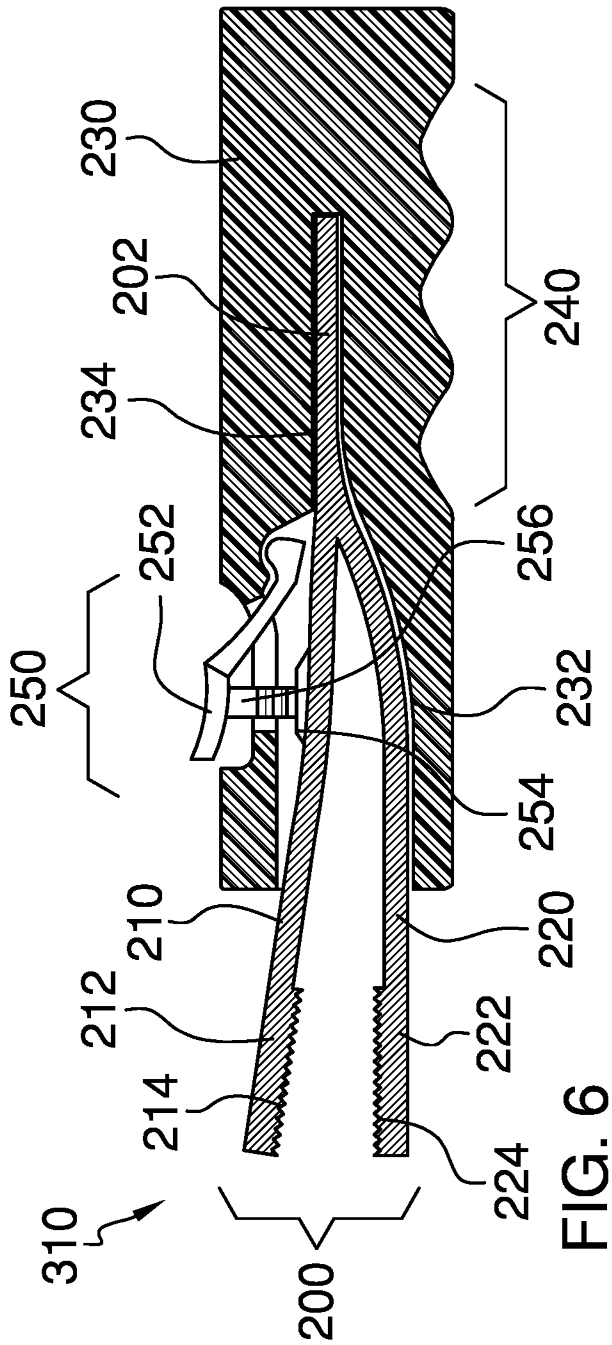
FIG. 6 is a longitudinal cross-sectional view of a second embodiment of the disclosure.
Figure 7:
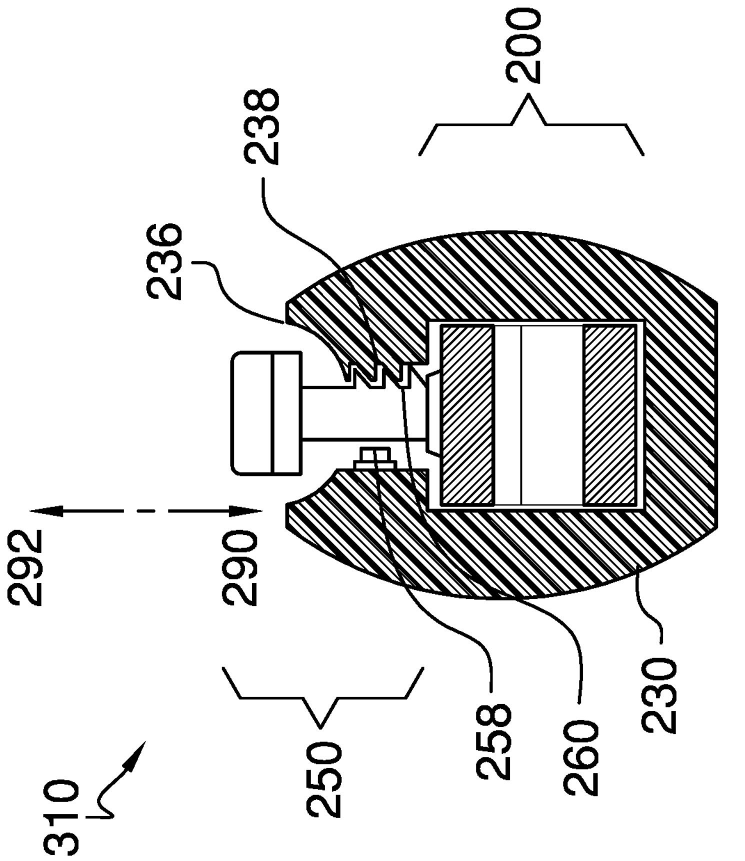
FIG. 7 is a lateral cross-sectional view of a second embodiment of the disclosure.

Detailed reference will now be made to a first potential embodiment of the disclosure, which is illustrated in FIGS. 1 through 7.

The chicken wing grabbing device 100 (hereinafter invention) comprises a pair of tongs 200, a housing 230, and an actuator 250. The invention 100 may be a hand-held utensil adapted for a user to hold a food item 900 during consumption of the food item 900. The housing 230 may be adapted to be held by a user's hand. The pair of tongs 200 coupled to the housing 230 may clench the food item 900 when the actuator 250 is engaged. The pair of tongs 200 may continue to hold the food item 900 until the actuator 250 is disengaged. As a non-limiting example, the food item 900 may be a chicken wing and the invention 100 may allow the user to consume the chicken wing without transferring sauce to the user's hand.

Throughout this document, proximal or rear may refer to the end of the invention 100 that is closest to the user during use. Distal or front may refer the end of the invention 100 that is farthest away from the user during use. For reference, the pair of tongs 200 may be accessible on the distal or front end of the invention 100.

The pair of tongs 200 may comprise an upper arm 210, a lower arm 220, and a stem 202. The pair of tongs 200 may be a Y-shaped semi-rigid armature. The proximal end of the upper arm 210 may join the proximal end of the lower arm 220 at the stem 202. The food item 900 may be grasped by the pair of tongs 200 when the upper arm 210 and the lower arm 220 are pressed together.

The distal end of the upper arm 210 may comprise an upper jaw 212. The distal end of the lower arm 220 may comprise a lower jaw 222. The inside surface of the upper jaw 212 may comprise upper teeth 214 and the inside surface of the lower jaw 222 may comprise lower teeth 224. The upper teeth 214 and the lower teeth 224 may seize the food item 900 such that friction between the pair of tongs 200 and the food item 900 is increased.

The housing 230 may be an enclosure that is adapted to be grasped by the user's hand. The housing 230 may comprise a front cavity 232 and a mid cavity 234. The front cavity 232 may be an internal cavity located at the distal end of the housing 230. The front cavity 232 may open at the distal end of the housing 230.

The mid cavity 234 may be an internal cavity located at the center of the housing 230. The mid cavity 234 may be joined to the front cavity 232 to create a single cavity of varying dimensions.

The pair of tongs 200 may be coupled to the housing 230 such that the pair of tongs 200 reside within the front cavity and the mid cavity 234. The stem 202 may reside in the mid cavity 234. The upper arm 210 and the lower arm 220 may be free to clench and release within the front cavity 232. The distal ends of the upper arm 210 and the lower arm 220 may extend beyond the distal end of the housing 230 such that the upper jaw 212 and the lower jaw 222 are exposed outside of the housing 230.

The front cavity 232 may be open at the top of the housing via an actuator aperture 236. The actuator 250 may movably couple to the housing 230 via the actuator aperture 236 such that the actuator 250 is accessible outside of the housing 230 and the actuator 250 may contact the upper arm 210 of the pair of tongs 200. The actuator aperture 236 may comprise housing teeth 238 that may restrict movement of the actuator 250.

In some embodiments, the housing 230 may comprise finger contours 240 that may be adapted to enhance the grip of the user. The finger contours 240 may be grooves located on the underside of the proximal end of the housing 230. The finger contours 240 may be adapted to conform to the shape of the user's hand such that the housing 230 is more comfortable to hold and slip resistant.

In some embodiments, the housing 230 may comprise a storage hook 242. The storage hook 242 may be located at the proximal end of the housing 230. The storage hook 242 may comprise a bend of the housing 230 of more than 90 degrees. The storage hook 242 may be operable to hang the invention 100 for storage.

The actuator 250 may be operable to move the upper arm 210 of the pair of tongs 200 towards the lower arm 220 in order to clench the pair of tongs 200 onto the food item 900 when the actuator 250 is in one or more engaged positions 290. The actuator 250 may permit the upper arm 210 to flex upwards to release the food item 900 when the actuator 250 is in a disengaged position 292. The actuator 250 may comprise a button 252 and a contactor 254. The button 252 may be exposed outside of the housing 230. The button 252 may be adapted to be moved by the user in order to engage and disengage the pair of tongs 200. The contactor 254 may be operable to make contact with the upper arm 210 such that the actuator 250 may move the upper arm 210. The button 252 may be coupled to the contactor 254 via an interposer 256 that passes through the actuator aperture 236.

In a first embodiment 300 of the invention 100, the actuator 250 may implement a slide action. The upper arm 210 may comprise a ridge 216 that may project upward at a location that is in front of the actuator 250 when the actuator 250 is in the disengaged position 292. The contactor 254 may form a distal-facing hook with a rounded bottom. The actuator 250 may be slid forward to the one or more engaged positions 290 and in the process may push the contactor 254 against the ridge 216 on the upper arm 210, thus moving the upper arm 210 downward. The actuator 250 may be slid rearward to the disengaged position 292 and in the process may withdraw the contactor 254, thus allowing the upper arm 210 to flex up.

The housing teeth 238 located on the side wall of the actuator aperture 236 may comprise a plurality of notches such that the actuator 250 may be retained at the one or more engaged positions 290 by the housing teeth 238. The housing teeth 238 may comprise angled surfaces such that the actuator 250 may slide forward but may not slide rearwards. The actuator 250 may therefore slide forward to the one or more engaged positions 290 until the pair of tongs 200 grasps the food item 900 and may be retained in the one or more engaged positions 290 until the actuator 250 is disengaged. The actuator 250 may be disengaged by sliding the button 252 rearward while applying lateral pressure to the button 252 such that the interposer 256 is clear of the housing teeth 238.

In a second embodiment 310 of the invention 100, the actuator 250 may implement a push action. The contactor 254 may rest on top of the upper arm 210 when the actuator 250 is in the disengaged position 292. The actuator 250 may pivot downwards to the one or more engaged positions 290 and in the process may push the contactor 254 down against the upper arm 210, thus moving the upper arm 210 downward. The actuator 250 may be released and may pivot upwards to the disengaged position 292 and in the process may lift the contactor 254, thus allowing the upper arm 210 to flex up. The spring action of the upper arm 210 may lift the actuator 250 when the actuator 250 is clear of the housing teeth 238.

The housing teeth 238 located on the side wall of the actuator aperture 236 may comprise a plurality of vertically oriented notches with angled surfaces. The interposer 256 may comprise interposer teeth 260 that are vertically oriented and comprise angled surfaces. The interposer teeth 260 may mesh with the housing teeth 238 such that the interposer teeth 260 may slide past the housing teeth 238 as the actuator 250 is pushed down but may prevent upward movement of the actuator 250. The actuator 250 may therefore be pushed down to the one or more engaged positions 290 until the pair of tongs 200 grasps the food item 900 and may be retained in the one or more engaged positions 290 until the actuator 250 is disengaged. The actuator 250 may be disengaged by applying lateral pressure to the button 252 to separate the interposer teeth 260 and the housing teeth 238. The spring action of the upper arm 210 may lift the actuator 250 when the interposer teeth 260 and the housing teeth 238 are separated. In some embodiments, a deformable stopper 258 may prevent the interposer teeth 260 and the housing teeth 238 from separating except in the presence of an external lateral force applied to the button 252.

In use, the user may hold the invention 100 by the housing 230. The invention 100 may be positioned to place the food item 900 between the upper jaw 212 and the lower jaw 222 of the pair of tongs 200. The user may move the actuator 250 to one or more engaged positions 290 to grasp the food item 900 with the pair of tongs 200 and the food item 900 will be held by the pair of tongs 200 until the actuator 250 is moved to a disengaged position 292. The user may release the food item 900 by moving the actuator 250 to the disengaged position 292 so that the food item 900 may be repositioned for further consumption or disposed of.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used in this disclosure, an "aperture" may be an opening in a surface or object. Aperture may be synonymous with hole, slit, crack, gap, slot, or opening.

As used in this disclosure, a "cavity" may be an empty space or negative space that is formed within an object.

As used herein, the words "couple", "couples", "coupled" or "coupling", may refer to connecting, either directly or indirectly, and does not necessarily imply a mechanical connection.

As used in this disclosure, the terms "distal" and "proximal" may be used to describe relative positions. Distal refers to the object, or the end of an object, that is situated away from the point of origin, point of reference, or point of attachment. Proximal refers to an object, or end of an object, that is situated towards the point of origin, point of reference, or point of attachment. Distal implies 'farther away from' and proximal implies 'closer to'. In some instances, the point of attachment may be the where an operator or user of the object makes contact with the object. In some instances, the point of origin or point of reference may be a center point, a central axis, or a centerline of an object and the direction of comparison may be in a radial or lateral direction.

As used in this disclosure, a "housing" may be a rigid or semi-rigid casing that encloses and protects one or more devices.

As used in this disclosure, the word "lateral" may refer to the sides of an object or movement towards a side. Lateral directions are generally perpendicular to longitudinal directions. "Laterally" may refer to movement in a lateral direction.

As used herein, the word "pivot" may include any mechanical arrangement that allows for rotational motion. Non-limiting examples of pivots may include hinges, holes, posts, dowels, pins, points, rods, shafts, balls, and sockets, either individually or in combination.

As used herein, "resilient" or "semi-rigid" may refer to an object or material which will deform when a force is applied to it and which will return to its original shape when the deforming force is removed.

As used in this disclosure, a "ridge" may be an elevated or raised portion of a structure.

As used in this disclosure, "vertical" may refer to a direction that is parallel to the local force of gravity. Unless specifically noted in this disclosure, the vertical direction is always perpendicular to horizontal.

With respect to the above description, it is to be realized that the optimum dimensional relationship for the various components of the invention described above and in FIGS. through 7, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A chicken wing grabbing device comprising:
 a pair of tongs, a housing, and an actuator;
 wherein the chicken wing grabbing device is a hand-held utensil adapted for a user to hold a food item during consumption of the food item;
 wherein the housing is adapted to be held by a user's hand;
 wherein the pair of tongs coupled to the housing clenches the food item when the actuator is engaged;
 wherein the pair of tongs continue to hold the food item until the actuator is disengaged;
 wherein the housing comprises a front cavity and a mid cavity;
 wherein the front cavity is an internal cavity located at a distal end of the housing;
 wherein the front cavity is open at a top of the housing via an actuator aperture;
 wherein the actuator aperture comprises housing teeth that restrict movement of the actuator.

2. The chicken wing grabbing device according to claim 1
 wherein the pair of tongs comprises an upper arm, a lower arm, and a stem;
 wherein the pair of tongs comprise a Y-shaped semi-rigid armature;
 wherein a proximal end of the upper arm joins a proximal end of the lower arm at the stem.

3. The chicken wing grabbing device according to claim 2
 wherein the food item is grasped by the pair of tongs when the upper arm and the lower arm are pressed together.

4. The chicken wing grabbing device according to claim 3
 wherein a distal end of the upper arm comprises an upper jaw;
 wherein a distal end of the lower arm comprises a lower jaw;
 wherein an inside surface of the upper jaw comprises upper teeth and an inside surface of the lower jaw comprises lower teeth;
 wherein the upper teeth and the lower teeth seize the food item such that friction between the pair of tongs and the food item is increased.

5. The chicken wing grabbing device according to claim 4 wherein the housing is an enclosure that is adapted to be grasped by the user's hand.

6. The chicken wing grabbing device according to claim 5 wherein the front cavity opens at the distal end of the housing.

7. The chicken wing grabbing device according to claim 6 wherein the mid cavity is an internal cavity located at a center of the housing;

wherein the mid cavity is joined to the front cavity to create a single cavity of varying dimensions.

8. The chicken wing grabbing device according to claim 7 wherein the pair of tongs is coupled to the housing such that the pair of tongs reside within the front cavity and the mid cavity;

wherein the stem resides in the mid cavity;

wherein the upper arm and the lower arm are free to clench and release within the front cavity;

wherein the distal ends of the upper arm and the lower arm extend beyond the distal end of the housing such that the upper jaw and the lower jaw are exposed outside of the housing.

9. The chicken wing grabbing device according to claim 8 wherein the actuator movably couples to the housing via the actuator aperture such that the actuator is accessible outside of the housing and the actuator contacts the upper arm of the pair of tongs.

10. The chicken wing grabbing device according to claim 9 wherein the housing comprises finger contours that are adapted to enhance the grip of the user;

wherein the finger contours are grooves located on an underside of a proximal end of the housing;

wherein the finger contours are adapted to conform to the shape of the user's hand such that the housing is more comfortable to hold and slip resistant.

11. The chicken wing grabbing device according to claim 9 wherein the housing comprises a storage hook;

wherein the storage hook is located at a proximal end of the housing;

wherein the storage hook comprises a bend of the housing of more than 90 degrees;

wherein the storage hook is operable to hang the chicken wing grabbing device for storage.

12. The chicken wing grabbing device according to claim 9 wherein the actuator is operable to move the upper arm of the pair of tongs towards the lower arm in order to clench the pair of tongs onto the food item when the actuator is in one or more engaged positions;

wherein the actuator permits the upper arm to flex upwards to release the food item when the actuator is in a disengaged position.

13. The chicken wing grabbing device according to claim 12 wherein the actuator comprises a button and a contactor;

wherein the button is exposed outside of the housing;

wherein the button is adapted to be moved by the user in order to engage and disengage the pair of tongs.

14. The chicken wing grabbing device according to claim 13 wherein the contactor is operable to make contact with the upper arm such that the actuator moves the upper arm;

wherein the button is coupled to the contactor via an interposer that passes through the actuator aperture.

15. The chicken wing grabbing device according to claim 14 wherein the actuator implements a slide action;

wherein the upper arm comprises a ridge that projects upward at a location that is in front of the actuator when the actuator is in the disengaged position;

wherein the contactor forms a distal-facing hook with a rounded bottom;

wherein the actuator is slid forward to the one or more engaged positions and in the process pushes the contactor against the ridge on the upper arm, thus moving the upper arm downward;

wherein the actuator is slid rearward to the disengaged position and in the process withdraws the contactor, thus allowing the upper arm to flex up.

16. The chicken wing grabbing device according to claim 15 wherein the housing teeth located on a side wall of the actuator aperture comprises a plurality of notches such that the actuator is retained at the one or more engaged positions by the housing teeth;

wherein the housing teeth comprises angled surfaces such that the actuator slides forward but does not slide rearwards;

wherein the actuator slides forward to the one or more engaged positions until the pair of tongs grasps the food item and is retained in the one or more engaged positions until the actuator is disengaged;

wherein the actuator is disengaged by sliding the button rearward while applying lateral pressure to the button such that the interposer is clear of the housing teeth.

17. The chicken wing grabbing device according to claim 14 wherein the actuator implements a push action;

wherein the contactor rests on top of the upper arm when the actuator is in the disengaged position;

wherein the actuator pivots downwards to the one or more engaged positions and in the process pushes the contactor down against the upper arm, thus moving the upper arm downward;

wherein the actuator is released and pivots upwards to the disengaged position and in the process lifts the contactor, thus allowing the upper arm to flex up;

wherein the spring action of the upper arm lifts the actuator when the actuator is clear of the housing teeth.

18. The chicken wing grabbing device according to claim 17 wherein the housing teeth located on the side wall of the actuator aperture comprises a plurality of vertically oriented notches with angled surfaces;

wherein the interposer comprises interposer teeth that are vertically oriented and comprise angled surfaces;

wherein the interposer teeth mesh with the housing teeth such that the interposer teeth slide past the housing teeth as the actuator is pushed down but prevent upward movement of the actuator;

wherein the actuator is pushed down to the one or more engaged positions until the pair of tongs grasps the food item and are retained in the one or more engaged positions until the actuator is disengaged;

wherein the actuator is disengaged by applying lateral pressure to the button to separate the interposer teeth and the housing teeth;

wherein the spring action of the upper arm lifts the actuator when the interposer teeth and the housing teeth are separated.

19. The chicken wing grabbing device according to claim 18 wherein a deformable stopper prevents the interposer teeth and the housing teeth from separating except in the presence of an external lateral force applied to the button.

* * * * *